Patented Feb. 24, 1931

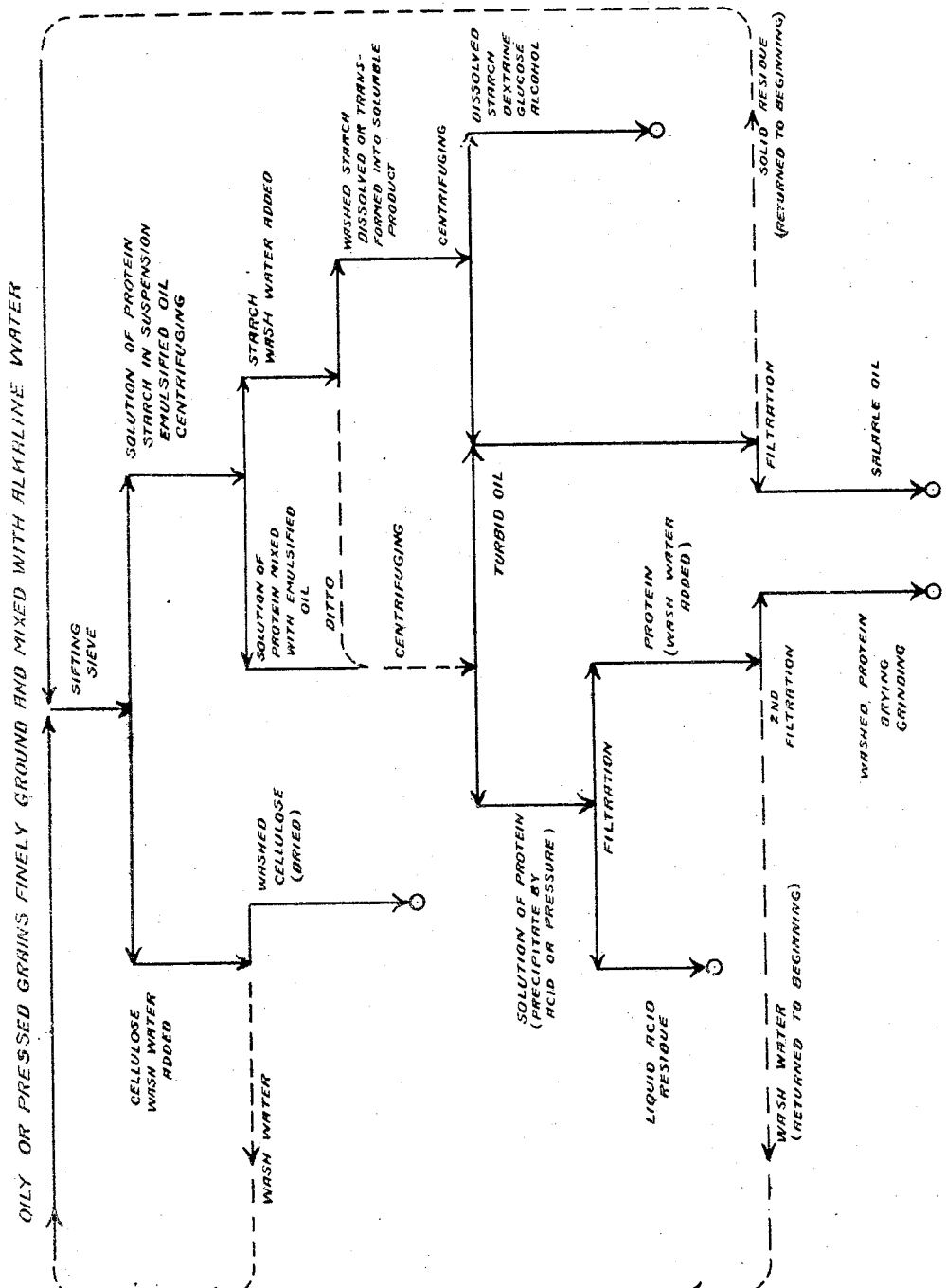

1,794,105

UNITED STATES PATENT OFFICE

LOUIS FERNAND DAVID AND GEORGES FELIZAT, OF MARSEILLE, FRANCE

PROCESS FOR THE TREATMENT OF OLEAGINOUS MATERIALS FOR SEPARATELY EXTRACTING ALL THE ELEMENTS THEREOF

Application filed December 21, 1925, Serial No. 76,886, and in France December 29, 1924.

Up to now, seeds or other oleaginous substances have been treated by pressure or by solvents in order to extract the fatty matters. The oil cake resulting from this operation has been used, either for cattle feeding, or as manure. The oleaginous seeds or their oil cake contain not only fatty matters, but protein nitrogenous matters.

The present invention aims to give a process for extracting separately from the oleaginous matters, oil, protein nitrogenous products in order to use these products, in the best possible way.

The process may be applied either directly to the oleaginous seeds, or to the residues obtained after extracting the larger portion of the oil contained in these seeds by usual methods.

The process which is the object of the invention and which is illustrated in the accompanying drawing in which the sole figure shows a flow sheet consists in crushing very finely in a suitable machine the oleaginous seeds or the oil cake. After the crushing, the necessary liquid is added.

This liquid is water to which is added a suitable solvent for protein nitrogenous matter.

From the mixture thus obtained, the elements that constitute the seed; oil, protein, starch and cellulose are extracted by means that are herein indicated.

It is best to extract with an aqueous solution (about ten parts by weight of solution to one part of matter to be treated) very slightly alkalinized by addition of sodium carbonate, ammonia or other alkalis except caustic soda which latter might saponify the oil to some extent.

The result of the crushing is to break up the cells of the seeds or the cells still whole in the oil cakes. The protein nitrogenous matter is dissolved in an alkaline solution, starch, fatty matters and cellulose are separated and come in suspension in the liquid.

This cellulose being swelled with water, a screening similar to that effected in the manufacture of fecula is resorted to, to separate it. It remains on the screen while the liquid and starch get through.

The cellulose is separated from the protein and starch adhering thereto by a second or third washing effected at room temperature with an alkaline solution identical to the one used in the first operation.

As it will be mentioned later, the waters having washed the protein nitrogenous matter after its precipitation, are, after alkalinization, also used for these washings.

The water progressively becomes richer in being successively used for the third, then the second, then the first washing of the matter.

At this point, and after the screening has separated the cellulose, the liquid contains dissolved starch in suspension and oil in emulsion.

If this liquid is decanted, it is observed that the starch sinks while the emulsion of oil tends to rise to the surface.

It would be possible to obtain thus the separation of the three mixed elements, emulsion of oil, solution of nitrogenous protein and starch. However, this decantation seems very long and industrially impracticable.

It is much better to treat this liquid in an appropriate centrifugal machine. Starch separates first and adheres to the walls of the bowl of the machine. This starch is washed. The water used for this washing is added to waters that have been previously used for washing starch.

This liquid contains no more solid deposit. It is composed of an emulsion of oil mixed with a solution of protein nitrogenous matter, that is to say, two liquids of different densities.

It is treated in high speed hyper-centrifuges. This machine gives non-emulsioned oil and a solution of protein nitrogenous matter.

In adding to this last solution always at cold temperature a suitable quantity of hydrochloric, sulfuric or other acid, the protein nitrogenous matter is precipitated in abundant flocks that are separated from the liquid by filtration or centrifugation.

Even, without addition of acid, the solution of protein nitrogenous matter from which the oil has been removed, when left to stand for a day, precipitates the protein nitrogenous matter due to the formation by fermentation of organic acids.

This protein nitrogenous matter, washed with cold water, is dried at low temperature and crushed (drying in vacuum gives a whiter product).

The protein nitrogenous matter thus obtained may be used to the same alimentary or industrial purposes as the casein of milk.

The water used for washing the protein nitrogenous matter, dissolving always a part of the nitrogenous protein, is used, after alkalinization for the washings previously mentioned.

The oleaginous seed to be treated is finely pulverized, either in the presence of a slightly alkaline solution or in the dry condition and then mixed with said solution.

The mixing is accomplished by means of a beater having four arms rotating in a trough perforated with holes 1 mm in diameter.

The residues of this screening are pulverized anew. The pulverizer used for all these operations is preferably of the centrifugal type.

The alkaline solution contains 3 grams per liter of sodium carbonate; it is put into contact with the pulverized seed only after having served for the refining or washing of the materials which have been subjected to a previous treatment, as will be indicated hereinafter.

The proportion of liquid to be used is 10 parts for 1 part of pulverized seed.

The liquid produced by this operation contains (a) in solution: the protein, as well as the other nitrogenous matters of the seed. It also contains the non-nitrogenous soluble materials: sugars, gums, etc. (b) in suspension: the cellulose swelled by water, the starch and the emulsified oil.

This liquid is passed into an oscillating screen or a screen with brushes like those used in starch factories for a similar operation.

The screening has the object of separating from the mixture the cellulose swollen with water. This cellulose is washed in the screen with alkaline water (3 gr. per liter). This water thereafter serves for the treating of the pulverized seed as stated above.

The liquid discharged from the screen passes into a centrifugal decanting device of current design. This operation has the object of clarifying the liquid and separating therefrom the starch which it holds in suspension. This starch adheres to the walls of the basket of the machine, whence it is extracted mechanically from time to time.

The sediment removed by the centrifugal decanter, starch or cellulose mixed with starch, is given a washing with alkaline water (3 grams of sodium carbonate per liter) and a second centrifugal decantation. The liquid resulting from this operation is used as stated above, for the treatment of fresh seed.

The solid residues, starch or a mixture of cellulose and starch, may be dried and sold for feeding animals, or used in the manufacture of glucose and alcohol in the usual way.

The liquid resulting from the first centrifugal decantation is fed into high speed centrifuges. These machines break up the emulsion which holds the oil and separate the latter from the mixture. This powerful centrifuging divides the treated liquid into two parts: (a) clear oil which need only be filtered to make it ready for sale; (b) alkaline liquid containing all the soluble matter of the seed.

This liquid, collected in a tank upon its discharge from the centrifuges, is treated with any desired acid; hydrochloric, sulfuric, acetic, or formic.

However, by storing the said liquid for about twenty-four hours, without adding anything thereto protein nitrogenous matter will precipitate spontaneously due to the formation of lactic or other organic acids in the liquid.

After precipitation the liquid is filtered or centrifuged to separate the precipitated substances; after washing, the latter are dried in vacuo or in the open air, then pulverized, screened and are ready for the market.

The filtered liquid contains only the constituents of the seed soluble in water: sugars, gums, starchy matter, etc.; it may be added to the solid residues and treated together therewith. It may also be made alkaline anew for use in treating fresh seed.

The starch resulting of the last operation, is used for the preparation of alcohol. It may, also in the usual way, be transformed in dextrin or glucose.

The process just described may be applied to all oleaginous matters.

Having thus described our invention what we claim as new and desire to secure by Letters Patent is:—

A process for the treatment of oleaginous seeds, in order to extract therefrom separately, oil, protein nitrogenous matter, starch and cellulose, comprising crushing these substances to break their cellular structure, mixing the crushed mass with a slightly alkaline aqueous solution to dissolve the protein nitrogenous matter, swell the cellulose and suspend the starch and oils, the latter being in emulsion, screening the liquid to separate the cellulose, and at the same time permitting the liquid with the suspended and dissolved matters to pass through, centrifuging the screened liquid at relatively slow speed to separate the suspended starch, then centrifuging the liquid residue of the first centrifuging step at relatively high speed to break the emulsion and separate the oil, and treating the liquid residue from the second centrifuging step with an acid to precipitate the protein nitrogenous matter.

LOUIS FERNAND DAVID.
GEORGES FELIZAT.